May 11, 1965   H. J. SEARER   3,182,841
SNAP-ON LID FOR BABY FOOD CONTAINERS
Filed Oct. 1, 1962
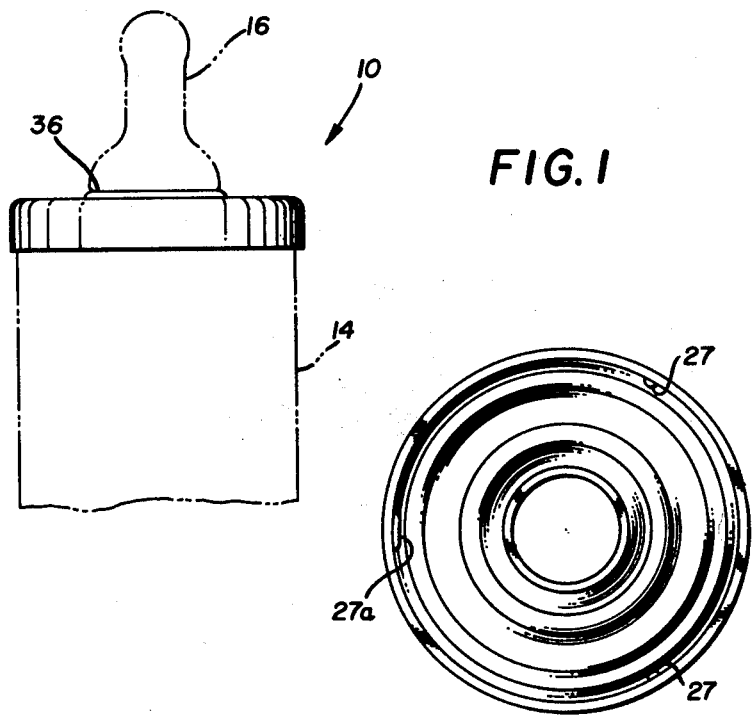
FIG. 1
FIG. 3
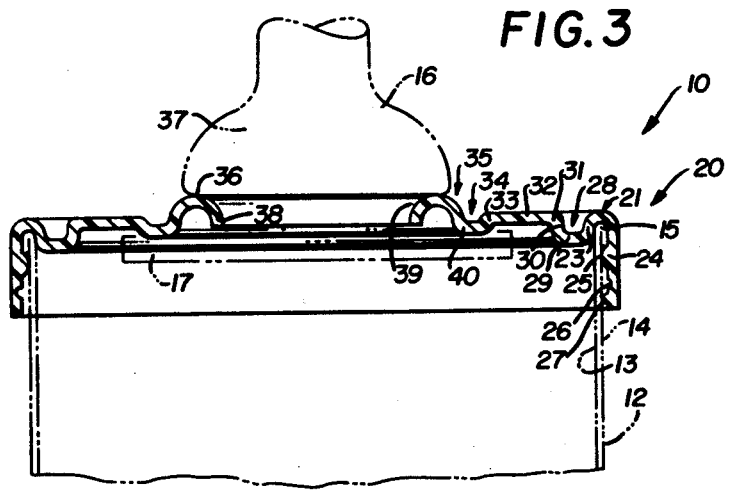
FIG. 2
INVENTOR.
HAROLD J. SEARER
BY Hamilton & Cook
ATTORNEYS 3,182,841
SNAP-ON LID FOR BABY FOOD CONTAINERS
Harold J. Searer, Akron, Ohio, assignor to Pet Milk Company, St. Louis, Mo., a corporation of Delaware
Filed Oct. 1, 1962, Ser. No. 227,398
5 Claims. (Cl. 215—11)

The present invention relates to an improved nursing article for use the feeding of edible fluids or liquids to infants. More particularly, the invention relates to an improved combination of container, nursing nipple, and snap-on lid. Specifically, the invention relates to a thermoplastic snap-on lid adapted to provide a liquid-tight seal between lid and container, and lid and inserted nipple.

Heretofore, baby food containers have been emptied into separate baby bottles or other articles designed for infant feeding. These bottles have required relatively expensive lids in order that they might be sterilized and reused. Also, the preparation of formula and the filling of the bottles has been somewhat inconvenient during travel and in other instances.

Baby food manufacturers market premixed formula and other baby food for sale in stores and pharmacies. These products would be more marketable if packaged in a suitable sterilized nursing article, or if the package or container could be adapted for direct use with a nipple. However, the cost of the container, lid and nipple must not create a significant increase in the price of the product. Thus, presently employed threaded and gasketed constructions would prove unsuitable because of the extra expense incurred in manufacturing and packaging. In addition, certain other disadvantages have been present in nursing bottle lids previously employed.

Accordingly, it is an object of the present invention to provide an improved, inexpensive combination nursing article for infant feeding.

It is a further object of the invention to provide an improved snap-on lid providing liquid-tight seals between lid and container, and lid and inserted nipple.

It is an even further object of the invention to provide a molded thermoplastic lid for baby food containers which may be sterilized without deformation.

It is a still further object of the present invention to provide an improved snap-on lid adapted for use with either disposable or refillable baby food containers.

It is a still further object of the present invention to provide an improved snap-on lid for baby food containers providing selective loose or liquid-tight fits with the container.

Other objects and advantages of the invention will become apparent from the following description and the drawing.

In the attached drawing:

FIG. 1 is a side view showing a baby food container and nursing nipple (in chain lines) and an improved snap-on lid according to the invention.

FIG. 2 is an enlarged longitudinal sectional view taken in a plane parallel to the axis of the container top and illustrating details of the improved lid.

FIG. 3 is a bottom plan view of the lid illustrating further details.

In the drawing, the combination of container, nipple and snap-on lid is indicated generally by the numeral 10.

The container has an inner surface 13 and an outer surface 14 terminating at the top of the container in a circumferential lip 15. The container may be made of any suitable material, including glass, plastic, metal or paper, permitting the top of the container to be formed with the circumferential lip. Further, though shown as cylindrical, the container or the opening in the container top, may have shapes other than circular such as squa rectangular, hexagonal or triangular.

The nursing nipple 16 may be of any suitable type h: ing a relatively thick, radially outwardly extending ( cumferential flange 17. A particularly suitable nipple shown in the inventor's U.S. Patent No. 2,513,896.

The snap-on lid 20 has a circumferential flange 21, fined by an inner skirt 23 and an outer skirt 24, for tachment to and fluid-tight engagement with the contair lip 15 and adjacent surfaces 13 and 14.

The inner face of the outer skirt 24 of the lid flange has a radially inwardly directed, rounded circumferent locking bead 25 for securely engaging the outer conta er surface 14 below the container lip 15.

Below the locking bead 25, the inner face of the flar skirt 24 is formed with one or more radially outwar directed indent rings 26. The purpose of the indent rir 26 is explained below.

Below the indent rings 26, the inner face of the flange skirt 24 has a series of radially inwardly direc protuberances or hemispherical catch bubbles 27. shown in FIG. 3, there may be three bubbles 27 equa spaced 120° apart. The purpose of the catch bubbles is explained below.

Radially inwardly of the flange 21, the lid 20 pref ably has at least two circular recessed portions wh permit momentary deformation of the lid for attachm to the container 12 and provide resiliency of structure maintaining the lid on the container after attachment. shown, there is a radially outer circular nave or reces portion indicated generally at 28. The recessed porti 28 is defined by the radially inner wall of flange skirt a horizontal portion 29 and a vertical wall portion Extending radially inwardly from the inner wall 30, fr a shoulder indicated at 31, is a flat medial portion 32. an inner shoulder indicated at 33, the flat portion 32 tersects the curved outer wall of a second or inner circu recessed portion indicated generally at 34. The in recessed portion 34 is shallower in depth than the ou recessed portion 28, and also serves to seat and seal upper surface of the nipple flange 17.

Extending axially upward and radially inward from inner recessed portion 34, the lid 20 has a curled hc flange portion indicated generally at 35, for retaining nipple 16 in communication with the interior of contair 12 when the top thereof is opened. The flange porti 35 includes a crown surface 36 for seating the bre portion 37 of a nipple 16. The radially innermost e 38 of the flange portion 35, which defines a circular op ing in the lid, provides a guide seat for the outwar directed neck portion 39 of the nipple 16, extending tween the nipple flange 17 and breast portion 37.

When the nipple 16 is manually inserted within opening in the lid 20, the axial distance between the un surface (40) of the inner lid recessed portion 34 and crown surface 36 is such that the nipple neck portion is uniformly distended and slightly stretched providin tight fluid seal.

Although the novel snap-on lid may be composed any suitable material, it is preferably made of thern plastic. More specifically the lid may be made of h density polyethylene (e.g., specific gravity 0.941–0.96 which is compression molded or injection molded i shape, the former technique being preferred.

This material possesses many useful properties wh provide improved results in this application. High d sity polyethylene is relatively strong, but yet resilie It is relatively hard, but not brittle. Therefore, it ideally suited for the novel snap-on lid 20.

The properties of resilience are utilized to provide liquid-tight seal between the lid and container withc requiring gasketing or thread and screw means. Th struction is made possible which alleviates problems
akage which arise during repeated use of gasketed,
down lids. Moreover, the snap-on construction
nates additional recesses in which germs or bacteria
t accumulate. A third, and highly important, advan-
lies in the fact that the snap-on lid is less expensive
oduce than former types due to the use of inexpen-
naterial and simple molding techniques.

e hardness of the material provides the desirable ad-
ges of resistance to distortion, scratching, or de-
ation; while, at the same time, the material is not
e as are thermosetting plastic lids of the type formerly
(e.g., Bakelite). Therefore, the snap-on lid 20 is
ubject to cracking and germs and bacteria will not
nulate in the crevices.

her useful properties include resistance to corro-
discoloration, or attack by weak acids and alkalies.
latter property renders the lid unaffected by weak
and alkalies (e.g., citric acid, acetic acid, etc.)
h are present in baby foods and formula. Thus,
d material will not contaminate the baby food.

rther important properties of high density polyethyl-
ertain to its heat characteristics. It has a relatively
resistance to continuous heat. Hence, the snap-on lids
be sterilized, by boiling or steaming in an autoclave
me sterilizer, without deleterious effects to the plas-
The material also has excellent resistance to cold
eratures so that the lid may be stored, in place on
ontainer, in coolers or refrigerators.

ferring now to the heat characteristics, although the
rial displays a high heat resistance index, certain
lems have prevented use of this or similar materials
liquid-tight snap-on lid which requires sterilization at
ig temperature (212° F.).

ring heating from normal room temperature to
t 140–180° F., the coefficient of thermal expansion
igh density polyethylene is positive, linear, and pre-
ble. However, in the temperature range from 140–
F., the material expands non-linearly and exhibits a
e of distortion and shrinkage.

the case of a snap-on lid having a circumferential
e, this effect would lead to an undesirable shrinkage
side diameter of the circumferential flange. This
kage destroys the snap-on fit of the lid with the con-
r required to ensure a liquid-tight seal.

has been found that this shrinkage effect can be
ensated for by the inclusion of one or more indent
26 on the inner face of the outer skirt 24 of the
ange 21. These indent rings provide greater inner
ce area for axial expansion of the flange skin which
d compensate for radial contraction of the inter-
ate portions of the lid. Also, the indentations im-
added resiliency to the outer skirt 24, thereby com-
ating for any slight shrinkage in the inner diameter
e lid. Thus, the lid may be sterilized repeatedly for
e and may be sterilized either on or off the con-
r without affecting the improved snap-on feature.

addition to the liquid-tight position discussed above,
ond or loose-fitting position of the lid 20 on the con-
r 12 is provided by the catch bubbles 27 located at
xially lower extremities of the inner face of the outer
24.

the preferred use of the improved lid, a sterile con-
r is first filled with formula and hermetically sealed.
lid 20 with inserted nipple 16 is placed over the closed
vith catch bubbles 27 being just below container lip
nd the locking bead 25 riding atop the lip 15. In
osition, the catch bubbles 27 merely serve to retain
id in a loose manner on the container. Next, the
iner, lid, and nipple are sterilized together in an auto-
; and, finally, the combination article 10 is pack-
in a sterile, hermetically-sealed plastic bag ready
ale. The purchaser simply removes the article from
ag, slips off the lid with inserted nipple, opens the
iner, and snaps the lid over the container in the liquid-tight position, thereby rendering the nursing ar-
ticle ready for use.

The liquid-tight fit of the snap-on lid with the con-
tainer is, in large measure, created by the spring action
of the radially outer recessed nave portion 28. This nave
portions acts as a circumferential spring means about the
fulcrum shoulder 31 to compressively urge inner skirt 23
of the flange 21 into fluid-tight engagement with the con-
tainer lip 15 and adjacent portions of inner surface 13
of the container.

The two recessed lid portions, the radially outer 28
and the radially inner 34, also function as embossed re-
inforcement ribs and serve to impart added rigidity to the
lid, thereby permitting the use of thin gauge material in
the manufacture of the lid.

As has been described, the combination article 10 is
well adapted for use with pre-mixed baby formula
packaged in standard disposable containers. This
pre-mixed product could be marketed in chain stores or
pharmacies; and the container, lid, and nipple could be
wrapped, either integrally or separately, in a sterile pack-
age.

While a preferred form of the invention has been
shown and described, it will be apparent that modifica-
tions therein could be made without departure from the
true spirit of the invention. Accordingly, the scope of
the invention is to be measured solely by the scope of the
appended claims.

What is claimed is:

1. In combination a snap-on lid and nipple for baby
food containers, said lid comprising a disc-shaped lid
body provided with a centrally located aperture, said
aperture receiving a nipple having an annular groove
and a bottom flange, a curved hoop-like flange surround-
ing said aperture and a first recessed portion joined to the
hook-like flange, said recessed portion having an inner
surface spaced axially from the hoop-like flange, said
curved hoop-like portion contacting the upper portion of
the nipple groove and said recessed portion contacting the
flange portion of the nipple to uniformly distend and
slightly stretch the nipple to provide a fluid tight seal be-
tween the lid and nipple, said lid having an intermediate
flat portion extending radially outwardly from the first
recess and a second recess joined to the outer peripheral
edge of the intermediate flat portion, and a cylindrical
second flange positioned coaxially and radially outwardly
of the second recess and located at the radially outer ex-
tremities of said lid body, said second flange being formed
of joined radially inner and radially outer skirts, said
inner skirt adjoining the inner surface of the container lip
and said outer skirt having a radially inner face carry-
ing an inwardly directed circumferential locking bead.

2. The structure of claim 1 wherein the lid is of thermo-
plastic having the properties of high density polyethylene
of specific gravity of about 0.941–0.96, and wherein the
inner face of the second flange outer skirt is provided with
at least one indent ring located axially below the locking
bead to compensate for expansion and contraction of the
lid during heating in the range of above 140–180° F.

3. The structure of claim 1 including a plurality of
spaced inwardly directed catch bubbles positioned on the
inner surface of the outer skirt to define an annular space
between the catch bubbles and the locking bead for loosely
retaining the lid on a container.

4. In combination a snap-on lid and nipple for baby
food containers, said lid having the properties of high
density polyethylene of specific gravity of about 0.941–
0.96 and comprising a disc-shaped lid body provided with
a centrally located aperture, said aperture receiving a
nipple having an annular groove and a bottom flange, a
curved hoop-like flange surrounding said aperture and a
first recessed portion joined to the hoop-like flange, said
recessed portion having an inner surface spaced axially
from the hoop-like flange, said curved hoop-like portion
contacting the upper portion of the nipple groove and said recess portion contacting the flange portion of the nipple to uniformly distend and slightly stretch the nipple to provide a fluid tight seal between the lid and nipple, said lid having an intermediate flat portion extending radially outwardly from the first recess, and a second recess joined to the outer peripheral edge of the intermediate flat portion, a cylindrical second flange positioned coaxially and radially outwardly of the second recess and located at the radially outer extremities of said lid body, said second flange being formed of joined radially inner and radially outer skirts, said inner skirt being a vertical wall defining the outermost edge of the second recess and adjoining the inner surface of the container lip, said outer skirt having a radially inner face carrying an inwardly directed circumferential locking bead, at least one indent ring located axially below the locking bead to compensate for expansion and contraction of the lid during heating in the range of above 140–180° F., and a plurality of spaced inwardly directed catch bubbles positioned on the inner surface of the outer skirt to define an annular space between the catch bubbles and the locking bead for loosely retaining the lid on a container.

5. In combination, a snap-on lid and nipple for baby food containers, said lid comprising a disc-shaped lid body provided with a centrally located aperture, said aperture receiving a nipple having an annular groove and a bottom flange, a curved hoop-like flange surrounding said aperture, and a recessed portion joined to the hoop-like flange, said recessed portion having an inner surface spaced axially from the hoop-like flange, said curved hoop-like portion contacting the upper portion of the nipple groove and said recessed portion contacting the flange portion of the nipple to uniformly distend and slightly stretch the nipple to provide a fluid tight seal between the lid and nipple, said lid having an intermediate flat portion extending radially outwardly from the first recess, a cylindrical second flange positioned coaxially and radially outwardly of the intermediate flat portion and located at the radially outer extremities of said lid body, said second flange being formed by radially inner and radially outer skirts, said inner skirt adjoining the inner surface of the container lip and said outer skirt having a radially inner face carrying an inwardly directed circumferential locking bead and a plurality of spaced, inwardly directed catch bubbles positioned on the inner surface of the outer skirt to define an annular space between the catch bubbles and the locking bead for loosely retaining the lid on a container.

References Cited by the Examiner
UNITED STATES PATENTS

| | | | |
|---|---|---|---|
| 2,558,195 | 6/51 | Pearl | 215— |
| 2,796,062 | 6/57 | Tupper | 128—2 |
| 2,802,609 | 8/57 | Donovan | 222—5 |
| 3,076,574 | 2/63 | Woodbury | 215— |

FRANKLIN T. GARRETT, *Primary Examiner.*

EARLE J. DRUMMOND, *Examiner.*